United States Patent [19]

Jakob

[11] Patent Number: 5,505,571
[45] Date of Patent: Apr. 9, 1996

[54] MANUALLY OPERATED DEVICE WITH A TIP FOR MATERIAL PROCESSING

[76] Inventor: Werner Jakob, Niggitalstrasse 22, CH-8630 Rüti, Switzerland

[21] Appl. No.: 374,945

[22] Filed: Jan. 18, 1995

[30] Foreign Application Priority Data

Jan. 18, 1994 [CH] Switzerland .................. 00141/94

[51] Int. Cl.⁶ .................. B23B 45/06; B23B 51/00
[52] U.S. Cl. .................. 408/124; 81/28; 144/104; 408/199; 408/226; 408/239 R
[58] Field of Search .................. 81/28, 29, 30, 81/31, 32, 33, 35; 408/47, 124, 199, 226, 239 R; 175/18; 144/104

[56] References Cited

U.S. PATENT DOCUMENTS

| | | | |
|---|---|---|---|
| 579,037 | 3/1897 | Bulock et al. | 144/104 |
| 1,425,270 | 8/1922 | Morgan | 81/28 |
| 4,260,301 | 4/1981 | Reiman | 408/47 |

FOREIGN PATENT DOCUMENTS

| | | | |
|---|---|---|---|
| 316054 | 6/1918 | Germany | 408/199 |
| 299807 | 5/1954 | Switzerland | 81/28 |

*Primary Examiner*—Daniel W. Howell
*Attorney, Agent, or Firm*—Speckman, Pauley & Fejer

[57] ABSTRACT

A manually operated device including a tool holder used as a handgrip and a tool with a material-processing tip. The tool has a shaft having an elbow with respect to the tool holder and being rotatably positioned in the tool holder. The material-processing tip is positioned on a first axis of the shaft, and a second axis of the shaft is rotatably maintained in the handgrip, so that a working pressure exerted on the handgrip is applied offset by a distance between the two axes. Material processing, for example deburring or countersinking, is possible without having to regrip the handgrip.

10 Claims, 1 Drawing Sheet

MANUALLY OPERATED DEVICE WITH A TIP FOR MATERIAL PROCESSING

BACKGROUND OF THE INVENTION

1. Field of the Invention

This invention relates to a manually operated device having a tool holder, a tool with a tip for processing material, and a shaft. The shaft of the tool has an elbow with respect to the tool holder, so that approximately parallel axes are provided, wherein the material-processing tip is located on a first axis.

2. Description of Prior Art

Manually operated devices are used for performing delicate mechanical work, such as countersinking, deburring or drilling small holes. They include a tool holder shaped as a handgrip, into which various material-processing tools in the form of inserts can be placed. Examples of such tools are files, awls, drills and countersinking tools.

A disadvantage of these conventional manually operated devices is that it is necessary to regrip the handgrip in the course of a rotatory movement. For example, a drill hole cannot be deburred in one movement. Because of this the work is performed more slowly and also less precisely.

A ratchet brace is known, with which it is possible to drill holes manually and without regripping. The ratchet brace has a grip on which a U-shaped bow is disposed in such a way that it is rotatable around the grip. A drill can be fastened at an end of the bow which is opposite the grip, the drill being disposed on the same axis as the grip. The effect of force by a user takes place along the drill axis. The ratchet brace must be operated with two hands or must have a solid support. The tool can only be used with a drill and is relatively large. The use of the grip and bow with other material-processing inserts, such as a file, is not possible. Thus the ratchet brace cannot be used with a variety of material-processing tools.

A manually operated drill device is known from Swiss Patent Publication CH-A-299,807 which has a shaft rotatably maintained in a hemisphere. The shaft is bent in such a way that three approximately parallel axes are provided. A processing tip connected with the shaft is located on a first axis. The second axis is formed by a shaft segment used as a handgrip and the third axis coincides with the hemisphere. The drill device is operated with one hand by holding the hemisphere in the palm of the hand and rotating the shaft segment used as a handgrip by the fingers, and repositioning the fingers after each turn.

Deburrers for interior and exterior deburring are known, which can be used without regripping. However, such deburrers have only one lateral cutting edge, which is curved. Thus, a portion of the lateral cutting edge is not aligned with the center axis of the tool grip. Thus, the tool grip can be rotated around a fixed point of the deburrer, during which the deburrer itself is guided along an opening. However, a solution for tools having a metal-processing tip, and are therefore used for other tasks than the above mentioned deburrer is unknown.

SUMMARY OF THE INVENTION

It is one object of this invention to provide a manual tool wherein regripping during a work operation is eliminated.

This object and others are achieved by a manually operated device wherein a tool holder is formed as a handgrip, and a shaft has two axes parallel and laterally offset with respect to each other. The second axis of the shaft can be rotatably maintained in the handgrip so that a working pressure, applied by the tool holder, is applied to the material-processing tip offset by the distance between the two axes, so that the device can be operated by holding the handgrip.

The tool holder is shaped so that it is preferably used as a handgrip, which achieves the one-handed operation of the device. The parallel offset of the two axes allows the working pressure to act along the first axis, and the rotatable holding of the second axis in the handgrip permits the performance of a rotary movement of more than 360° around the first axis, along which the material-processing tip is positioned, without having to repeatedly release and regrip the handgrip.

Preferred embodiments according to this invention are represented in the drawings and will be explained in conjunction with the description below.

DESCRIPTION OF PREFERRED EMBODIMENTS

Figure 1:
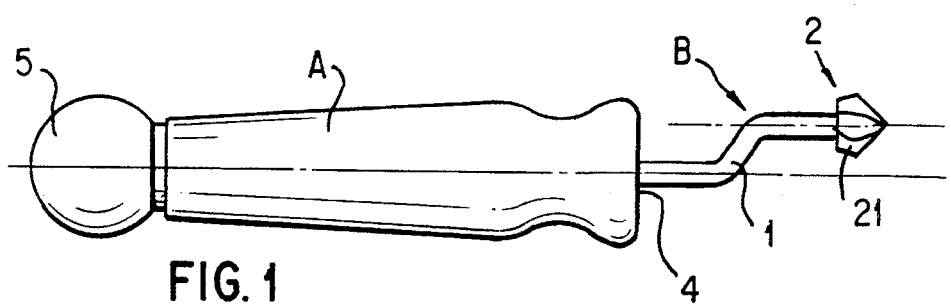
FIG. 1 shows a manually operated device in accordance with one preferred embodiment of this invention.

One preferred embodiment of the manually operated device in accordance with this invention, comprising a tool holder A and a tool B, is shown in FIG. 1.

The tool holder A is preferably a longitudinally formed handgrip, and has a straight, preferably frustoconical shape. A spring-tension chuck 4 is positioned in the tool holder A. The spring-tension chuck 4 permits the removable connection of the tool B from the tool holder A. Actuation of the spring-tension chuck 4 is achieved by a rotating knob 5 positioned on a rear end portion of the tool holder A and forming an extension of the spring-tension chuck 4. If the rotating knob 5 is pushed into the tool holder A, a spring in the interior of the tool holder A is compressed and the spring-tension chuck 4, compressed in the tool holder A, opens as it is partially expelled from the front of the tool holder A. According to another preferred embodiment of this invention, a sliding muff is used in place of the spring-tension chuck 4.

Figure 3:
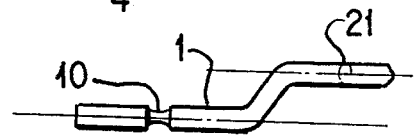
FIG. 3 shows a tool in accordance with one preferred embodiment of this invention with a material-processing tip.

The tool B has a shaft 1 and a tool head 2 with a material-processing tip 21 or crown. The tool B can be, for example, a countersinking, deburring or drilling tool. The shaft 1 can be partially inserted into the spring-tension chuck 4 and held in the tool holder A. In one preferred embodiment according to this invention the shaft 1 can be rotated with respect to the spring-tension chuck 4 and the tool holder A. The shaft 1 can have an annular groove 10 formed in a rear, straight portion of the shaft 1, as shown in FIG. 3, where the tool B, according to one preferred embodiment of this invention is shown without a tool holder. A corresponding rib can be formed in the interior of the spring-tension chuck 4. Thus the shaft 1, which is axially held in the spring-tension chuck 4 in an interlocking manner, cannot be laterally moved in the tool holder A without first opening the spring-tension chuck 4.

The shaft 1 has an elbow. As used throughout the specification and claims, the term elbow refers to a shaft having three axes, the first and second axes being approximately parallel with respect to each other, and lying in approximately the same plane and having end portions positioned on a third axis which is approximately perpendicular to the first and second axes, and the first and second axes extending from the third axis in approximately opposite directions with respect to each other. Thus, two approximately parallel axes are created. The first axis, the center axis of the tool B, is offset parallel with respect to the second axis, the center axis of the tool holder A, which is used as a handgrip. When using the device, the tool B is inserted into a bore to be processed. A user applies a force, the working pressure, in a direction of the tool holder A. Thus, the working pressure is applied offset with respect to the material-processing tip 21, wherein the offset corresponds to the distance between the approximately parallel axes. The user can hold the device with one hand, with the ball-shaped rotating knob 5 lying in the palm of the hand and the fingers holding the handgrip. The bore to be processed is used as a guide or fixing point. The handgrip can be rotated around the bore, and the tool B is also rotated and removes material because of the pressure exerted on the tool B. Thus, the tool B, together with the tool holder A, can be rotated without the user having to regrip the handgrip. This is achieved by the elbow and the rotatable, interlocking seating of the shaft 1.

In one preferred embodiment shown in FIG. 1, the shaft 1 of the tool B is constructed in one piece, a tool head 2 being formed on the shaft 1. The shaft 1 with the elbow thus makes a transition into the tool head 2 with the material-processing tip 21.

Figure 2:
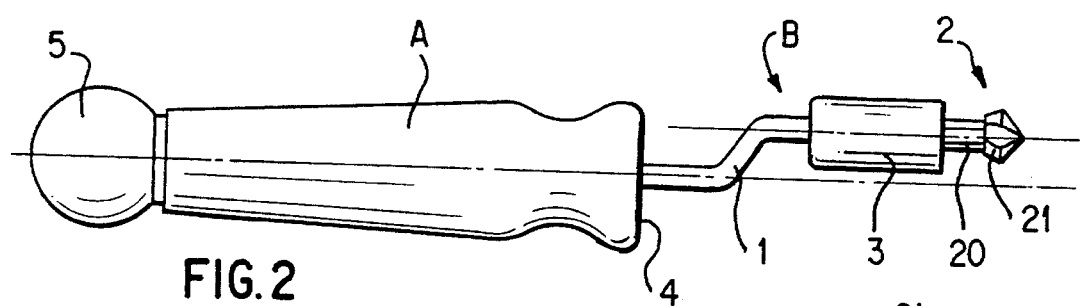
FIG. 2 shows another preferred embodiment of the manually operated device of this invention with a multi-part tool.

In another preferred embodiment of this invention, shown in FIG. 2, the tool B has a two-piece shaft 1. One shaft portion has an elbow and a holder 3 for the tool head 2. The tool head 2 with its material-processing tip 21 is formed on a second shaft portion. The holder 3 preferably has an interior bore shaped as a polygon, such as a hexagon. The second shaft portion with the tool head 2 preferably has a corresponding polygonally shaped exterior section 20, such as a hexagon. Section 20, together with the polygonally shaped bore of holder 3, forms a releasable axial plug connection, and the second shaft portion can be secured by friction, a magnet or a locking spring. Thus it is possible to use many different tool heads 2 with the same elbowed shaft 1, which reduces the cost of the tools.

Figure 4:
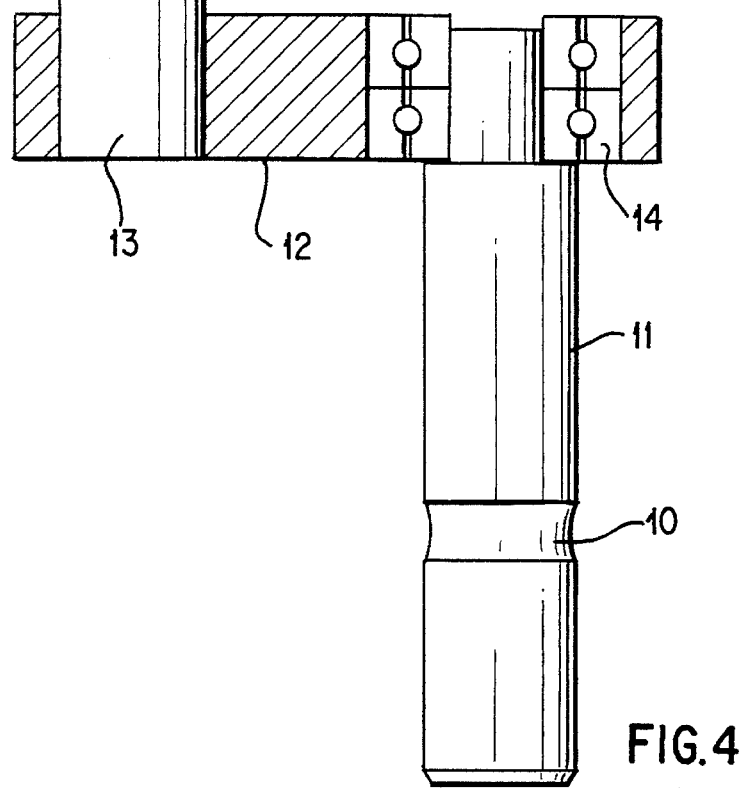
FIG. 4 shows another preferred embodiment of the manually operated device of this invention with a multi-part shaft.

According to another preferred embodiment of this invention, shown in FIG. 4, the tool B has a multi-part shaft. A first partial shaft 11 is straight and has the annular groove 10 for the rotation and axial fixing of the tool B. Thus, the first partial shaft 11 is aligned with a center axis of the tool holder A, not shown in FIG. 4. A second partial shaft 12 is positioned perpendicularly to the first partial shaft 11. An end portion of the first partial shaft 11 engages a pressed-in ball bearing 14 positioned on an end portion of the second partial shaft 12. A third partial shaft 13 is interchangeably positioned at another end portion of the second partial shaft 12 and fixed against relative rotation. The third partial shaft 13 makes a one-piece transition into the material-processing tip 21. The third partial shaft 13 with the material-processing tip 21 is positioned parallel to the first partial shaft 11 and the center axis of the handgrip, and is laterally offset with respect to the first partial shaft 11 and thus, the multi-part shaft shown in FIG. 4 also has an elbow.

Thus it is possible by the device according to this invention, which can be operated with one hand, to debur or countersink bores without regripping or renewed gripping of the handgrip. In addition, a single handgrip can be used with different tools, including tools with shafts having an elbow, and other known tools, not having an elbow, such as files or awls.

I claim:

1. In a manually operated device having a tool holder (A), a tool (B) with a material-processing tip (21) and a shaft (1), the improvement comprising:

the shaft (1) of the tool (B) having an elbow with respect to the tool holder (A), the shaft having a first longitudinal axis, and a second longitudinal axis, the first and second longitudinal axes being approximately parallel with respect to each other, the material-processing tip (21) positioned on the shaft along the first longitudinal axis, an exterior surface of the tool holder (A) forming a handgrip, and the tool holder (A) rotatably positioned on the shaft along the second longitudinal axis, whereby a working pressure exerted on the material-processing tip (21) by the tool holder (A) is applied offset by a distance between the first and second longitudinal axes, so that the manually operated device can be operated by holding the tool holder (A).

2. In a manually operated device in accordance with claim 1, wherein the tool holder (A) is an elongated member.

3. In a manually operated device in accordance with claim 1, wherein the tool (B) comprises one of a countersinking tool, a deburrer and a drill.

4. In a manually operated device in accordance with claim 1, further comprising releasable connection means for releasably connecting the shaft (1) with the tool holder (A).

5. In a manually operated device in accordance with claim 4, wherein the releasable connection means comprise a spring-tension chuck (4), a rib positioned in the spring-tension chuck (4), the shaft (1) forming a groove (10), the shaft (1) rotatably positioned within the spring-tension chuck (4), and the rib extending into the groove 10.

6. In a manually operated device in accordance with claim 1, wherein the material-processing tip (21) and the shaft (1) are a one-piece unit.

7. In a manually operated device in accordance with claim 1, wherein the tool (B) comprises a first partial shaft and a second partial shaft, a tool head (2) being positioned on the first partial shaft, and the second partial shaft having a holder (3) for receiving the first partial shaft.

8. In a manually operated device in accordance with claim 7, wherein the first partial shaft has an exterior polygonal shape (20), and the holder (3) has an interior polygonal shape to releasably receive the exterior polygonal shape (20) of the first partial shaft and form an interlocking plug connection.

9. In a manually operated device in accordance with claim 1, wherein the shaft (1) comprises a first partial shaft (11), a second partial shaft (12) and a third partial shaft (13), the second partial shaft (12) having a roller bearing (14) positioned on a first end portion of the second partial shaft (12), the first partial shaft (11) being perpendicular to the second partial shaft (12) and having an end portion positioned in the roller bearing (14), a center axis of the first partial shaft (11) being in axial alignment with a center axis of the tool holder (A), the third partial shaft (13) positioned on a second end portion of the second partial shaft (12), a center axis of the third partial shaft (13) parallel to and laterally offset with respect to the center axis of the tool holder (A), the third partial shaft (13) making a transition into the material-processing tip (21).

10. In a manually operated device in accordance with claim 9, wherein the third partial shaft (13) is replaceably positioned in the second partial shaft (12).

* * * * *